Sept. 6, 1949.  C. O. HANSON  2,481,420
HYDRAULIC ACTION CENTER GAUGE
Filed Aug. 8, 1947
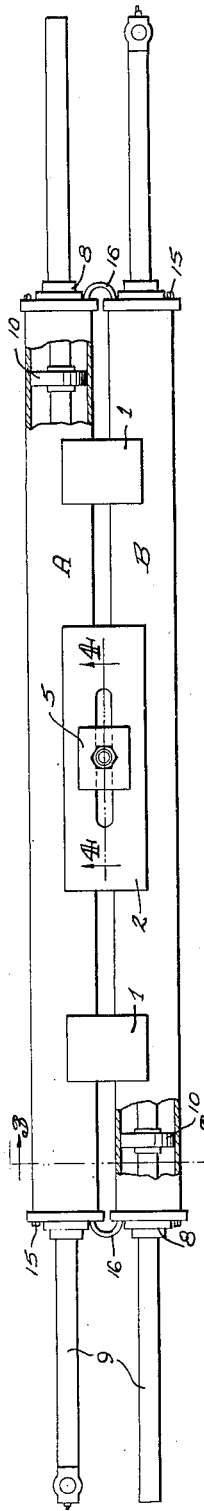
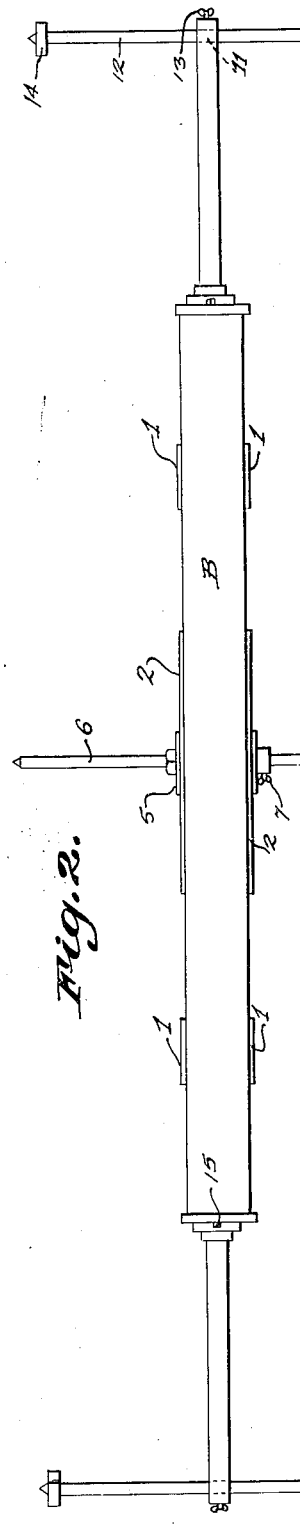
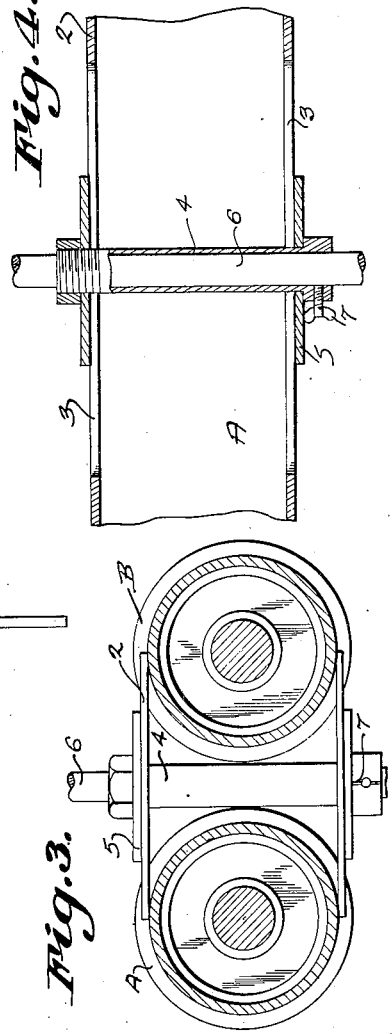
C. O. Hanson
INVENTOR
BY
ATTORNEYS.

Patented Sept. 6, 1949

2,481,420

UNITED STATES PATENT OFFICE 2,481,420

HYDRAULIC ACTION CENTER GAUGE

Clarence O. Hanson, Rock Island, Ill.

Application August 8, 1947, Serial No. 767,419

1 Claim. (Cl. 33—74)

This invention relates to gauges and more particularly and specifically to new and useful improvements in alignment gauges for automotive vehicles of which the following is a specification.

The primary object of this invention resides in the provision of a novel and improved construction of gauges for use to check the alignment of the frames and chassis of automotive vehicles which are more accurate, easier to use, and more durable over a long period of time than those like gauges employed today.

Another object of this invention lies in the provision of alignment gauges which may be used to determine whether vehicle frames are bent or twisted, and if such a condition exists the gauges may be used to isolate such condition in the frame for purposes of correction.

Still another object of this invention is the provision of an alignment gauge as set forth which is constructed so as to remain dust, dirt and rust proof eliminating the faults and break downs resulting to those gauges now in use which comprise tapes and rollers or sheaves and cables which are exposed to the elements.

Still a further object of this invention is the provision of an alignment gauge such as described which is of an extremely simple and inexpensive design and which is relatively cheap of manufacture.

Still further improvements and advantages of this invention will readily appear to those skilled in the art when the following description is read in the light of the accompanying drawings in which:

Fig. 1 is a top plan view of the gauge.

Fig. 2 is a side elevation of the gauge.

Fig. 3 is a vertical section taken on line 3—3 of Fig. 1.

Fig. 4 is a vertical section taken on line 4—4 of Fig. 1.

Referring now to the accompanying drawings which illustrate only the preferred embodiment of this invention and in which like characters indicate similar parts throughout, A and B designate a pair of hydraulic cylinders which are rigidly interconnected in parallel closely spaced coincidence by a pair of axially spaced, diametrically opposed plates 1. A pair of elongated plates 2 are rigidly secured between said cylinders at their longitudinal centerline, said plates being longitudinal with the cylinders and diametrically opposed relative thereto. Each of the plates 2 are provided with coinciding elongated slots 3 formed axially therein and carrying an elongated tube 4 perpendicularly therebetween, said tube being disposed between said cylinders and slidably adjustable axially within said slots by virtue of a pair of flat bars 5, which straddle the slots 3 and slide on the plates 2 into which each of the ends of the tube 4 are secured.

An elongated pointer pin 6 is slidably housed in the tube 4 and is adapted to be vertically adjusted to affixed vertical positions by means of a set screw 7 carried in the tube 4 below the cylinders A and B.

Each of the cylinders A and B are provided at each end with a liquid-tight packing gland 8 through which an elongated piston rod 9 is slidably mounted and extended beyond each end of each of the cylinders.

These piston rods 9 are each provided with a piston 10 within their respective cylinders and each rod is provided with a vertically transverse eye 11 in one extended end thereof, said eyes being at the opposed ends of the two rods.

Each of the piston rod eyes 11 slidably carry an elongated bar 12 therein which are vertically adjustable by reason of the thumb screws 13 opening one into each of said eyes from the adjacent end of the rod. The upper end of each of the bars 12 are provided with hanging hooks 14 which are adapted to engage the side frames of a vehicle to suspend the cylinders A and B horizontally, transverse the frame therebeneath.

The cylinders are filled with a hydraulic material such as oil or the like through filling plugs 15 provided in the ends thereof and each pair of adjacent ends of the two cylinders are joined by bypass tubes 16 which permit the flow of the hydraulic material between the cylinders to balance the pressures therein when the pistons are moved. This bypass flow between the cylinders also insures the cooperative equal movement of the two piston rods.

In the operation of checking the alignment of a vehicle frame or body three gauges, of the type set forth, are suspended from the vehicle frame in spaced apart relationship along the length of the frame by extending the piston rods to such positions as to bring the hanging hooks in engagement with opposed points on the frame.

The pointer pins 6 of each of the gauges are then secured at the gauge centers and by sighting over these three pins it may be determined whether or not the vehicle frame is bent. If all points of the pins align there is no bend. If the pins do not align then a bend is present and the point or area of the bend may be isolated by varying the gauge positions along the frame.

If the gauges are all parallel, transverse the frame, then there is no twist in the frame, but should the gauges not be parallel then the frame is twisted and the twisted portion may be found by varying the gauge positions along the frame.

Thus it may be seen that an accurate and easy to use gauge has been provided which is of a simple and durable construction and which would be long-lasting with high accuracy and efficiency yet which is of relatively cheap manufacture.

Having thus described and explained the structure and function of this invention and with full belief that modifications included in the scope of the appended claim are contemplated, what I desire to claim in Letters Patent is:

A vehicle body and frame alignment gauge, comprising a pair of spaced connected parallel fluid containing cylinders, pistons and rods operating within the cylinders, plates secured to the upper and lower sides of the cylinders, said plates having elongated aligning openings, upper and lower flat bars adjustable along the plates and having openings registering with the elongated openings, an elongated pointer pin extending through the openings of the plates and flat bars and being connected with the bars, the bars adjustably mounting the elongated pointer pin along the cylinders, vertically adjustable elongated gauge bars mounted on the outer ends of the rods, hooks at the upper ends of the elongated gauge bars whereby the gauge is hung on a vehicle chassis, and pipes establishing communication between the ends of the cylinders whereby the fluid in the cylinders passes between the cylinders as the piston rods are operated, governing the movements of the rods and gauge bars with respect to each other.

CLARENCE O. HANSON.

REFERENCES CITED

The following references are of record in the file of this patent:

UNITED STATES PATENTS

| Number | Name | Date |
|---|---|---|
| 206,018 | Henrich | July 16, 1878 |
| 2,000,866 | Smith | May 7, 1935 |
| 2,070,518 | Smith | Feb. 9, 1937 |
| 2,401,980 | Smith | June 11, 1946 |